United States Patent
Danser et al.

[11] Patent Number: 6,079,142
[45] Date of Patent: Jun. 27, 2000

[54] ICE FISHING SYSTEM

[76] Inventors: Darcy P. Danser; Daniel C. Frey, both of 7247 Sandhill Rd., Akron, N.Y. 14001

[21] Appl. No.: 09/146,495

[22] Filed: Sep. 3, 1998

[51] Int. Cl.[7] .......................... A01K 85/01; A01K 93/00; A01K 97/12; A01K 97/00
[52] U.S. Cl. ........................................ 43/17; 43/4; 43/54.1
[58] Field of Search .................. 43/17, 54.1, 24, 43/25, 4, 4.5, 44.2, 44.4, 44.8, 44.6, 43.1, 43.12, 44.87, 44.88, 44.9, 44.92, 44.97, 44.91, 41, 41.12, 43.11, 43.14, 43.15; D22/147, 148

[56] References Cited

U.S. PATENT DOCUMENTS

| | | | |
|---|---|---|---|
| 434,426 | 8/1890 | Costellow | 43/17 |
| 1,808,736 | 6/1931 | Hernke | 43/17 |
| 3,012,352 | 12/1961 | Logsdon | 43/17 |
| 3,034,246 | 5/1962 | Davidson | 43/17 |
| 3,147,563 | 9/1964 | Molter | 43/17 |
| 3,389,489 | 6/1968 | Burns | 43/17 |
| 3,407,528 | 10/1968 | Lenning | 43/17 |
| 3,530,611 | 9/1970 | Britt | 43/17 |
| 3,670,443 | 6/1972 | Federline | 43/17 |
| 3,729,849 | 5/1973 | Richard | 43/17 |
| 3,835,571 | 9/1974 | Berry | 43/43.12 |
| 4,016,670 | 4/1977 | Pihaja et al. | 43/17 |
| 4,043,069 | 8/1977 | Zahner | 43/15 |
| 4,043,070 | 8/1977 | Lamothe | 43/21.2 |
| 4,567,686 | 2/1986 | Akom | 43/17 |
| 4,621,446 | 11/1986 | Anderson | 43/17 |
| 4,642,930 | 2/1987 | Graf | 43/19.2 |
| 4,829,697 | 5/1989 | Nakata | 43/17 |
| 4,905,398 | 3/1990 | Botbyl | 43/17 |
| 4,949,497 | 8/1990 | Lindell | 43/17 |
| 5,040,323 | 8/1991 | Hughes, Jr. | 43/18.1 |
| 5,363,583 | 11/1994 | Brunner | 43/17 |
| 5,414,953 | 5/1995 | Taylor | 43/54.1 |
| 5,588,243 | 12/1996 | Caldwell | 43/4 |
| 5,913,673 | 6/1999 | Womac | 43/54.1 |
| 5,915,940 | 6/1999 | Gross et al. | 43/17 |

FOREIGN PATENT DOCUMENTS

| | | | |
|---|---|---|---|
| 459902 | 12/1949 | Canada | 43/26 |
| 497518 | 4/1953 | Canada | 43/26 |
| 727359 | 2/1966 | Canada | 43/17 |
| 904011 | 7/1972 | Canada | 43/17 |
| 910627 | 9/1972 | Canada | 43/17 |
| 910628 | 9/1972 | Canada | 43/17 |
| 2051564 | 1/1981 | United Kingdom | 43/26 |
| 2237717 | 5/1991 | United Kingdom | 43/26 |
| WO 94/15458 | 7/1994 | WIPO | 43/17 |

*Primary Examiner*—Michael J. Carone
*Assistant Examiner*—Frederick T. French, III

[57] ABSTRACT

An ice fishing system is provided including a post having a lower end and an upper end. Also included is a fishing pole pivotally coupled to the upper end of the post with fishing line depending from an end thereof.

10 Claims, 3 Drawing Sheets

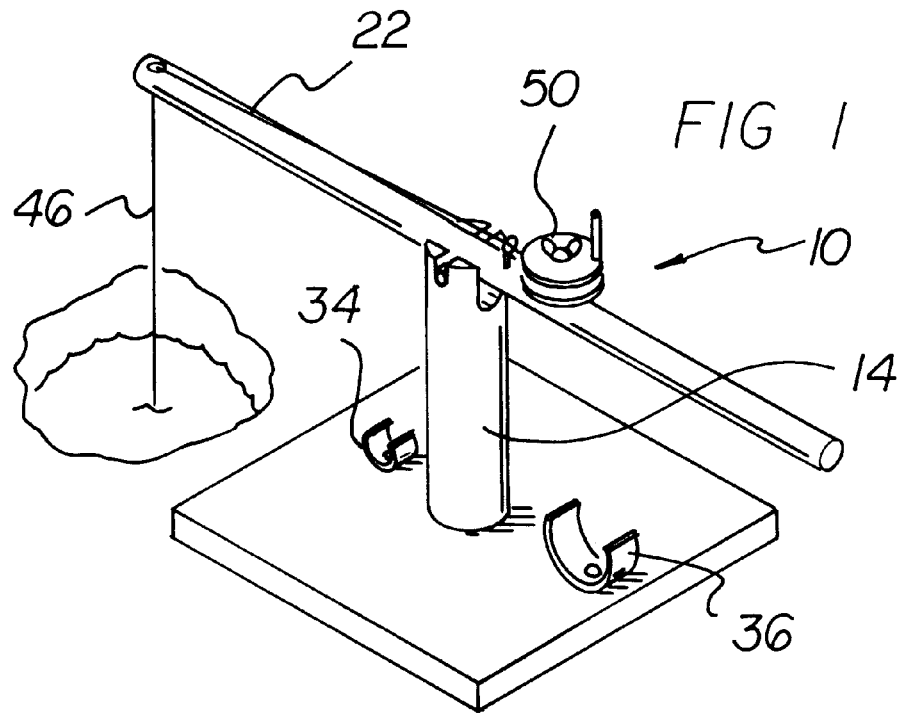
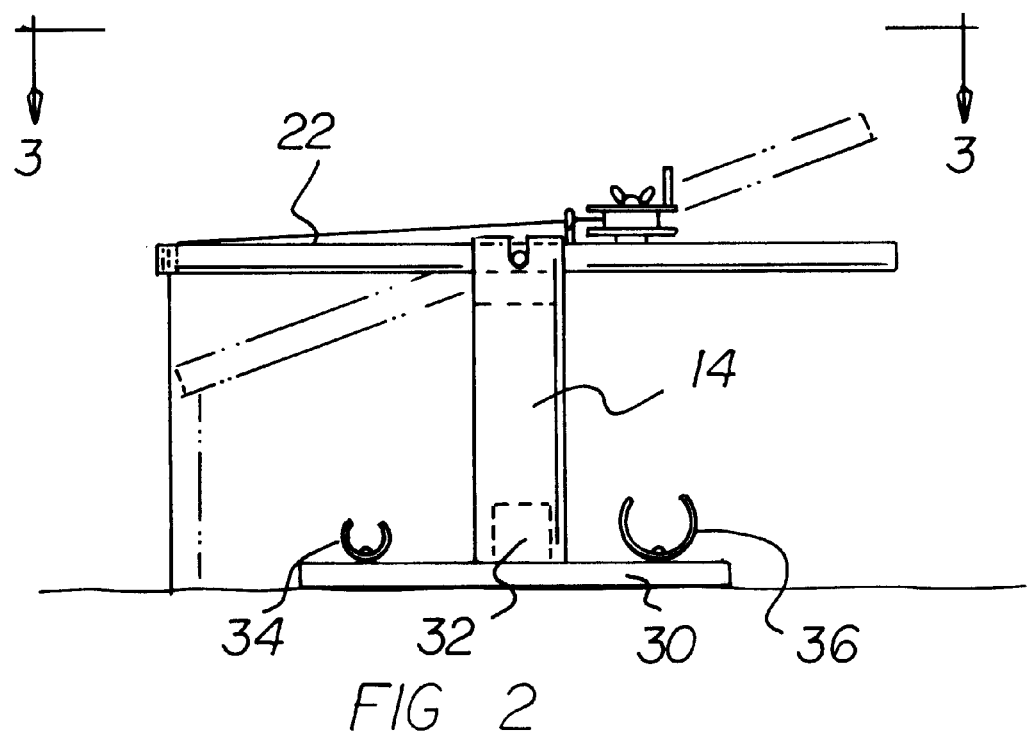

FIG 3
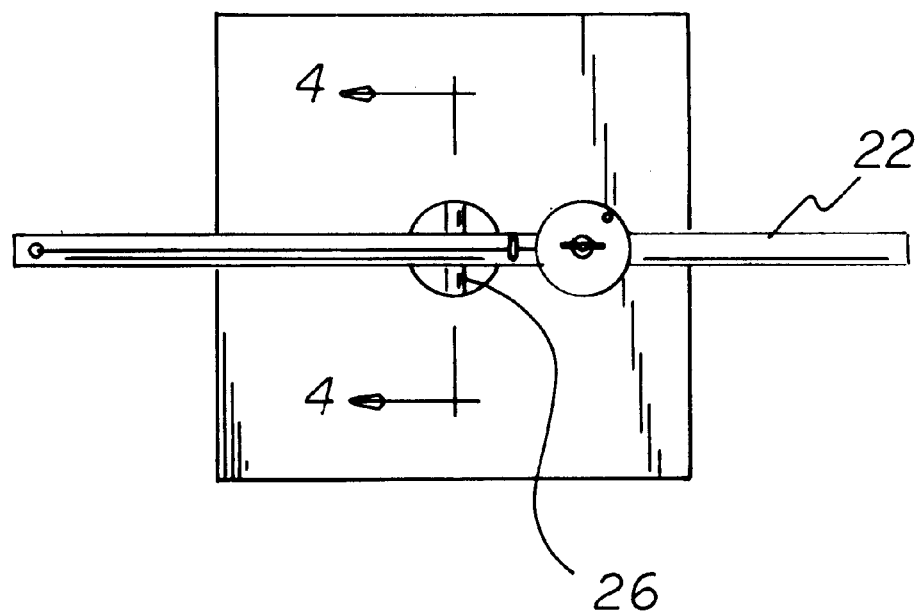
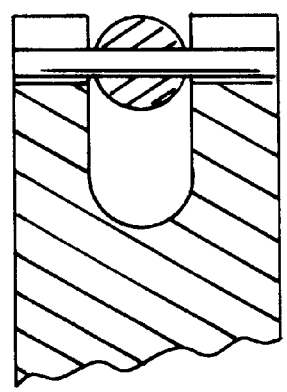
FIG 4

ICE FISHING SYSTEM

BACKGROUND OF THE INVENTION

1. Field of the Invention

The present invention relates to ice fishing devices and more particularly pertains to a new ice fishing system for affording minimal resistance upon a fish strike.

2. Description of the Prior Art

The use of ice fishing devices is known in the prior art. More specifically, ice fishing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art ice fishing devices include U.S. Pat. No. 5,339,558; U.S. Pat. No. 5,197,218; U.S. Pat. No. 5,249,387; U.S. Pat. No. 4,980,986; U.S. Pat. No. Des. 282,273; and U.S. Pat. No. 5,107,613.

In these respects, the ice fishing system according to the present invention substantially departs from the conventional concepts and designs of the prior art, and in so doing provides an apparatus primarily developed for the purpose of affording minimal resistance upon a fish strike.

SUMMARY OF THE INVENTION

In view of the foregoing disadvantages inherent in the known types of ice fishing devices now present in the prior art, the present invention provides a new ice fishing system construction wherein the same can be utilized for affording minimal resistance upon a fish strike.

The general purpose of the present invention, which will be described subsequently in greater detail, is to provide a new ice fishing system apparatus and method which has many of the advantages of the ice fishing devices mentioned heretofore and many novel features that result in a new ice fishing system which is not anticipated, rendered obvious, suggested, or even implied by any of the prior art ice fishing devices, either alone or in any combination thereof.

To attain this, the present invention generally comprises a vertically disposed post which has a large U-shaped notch at its upper end for receiving a fishing pole and a small U-shaped notch at the upper end for receiving a pivot pin, as soon will become apparent. The notches are at right angles with respect to each other. A lower end of the post is equipped with a disk-shaped recess formed therein. A planar rectangular base is provided with an upstanding cylindrical projection for frictionally receiving the lower end of the post. The base also has two upwardly extending resilient U-shaped clamps. Such clamps include a large clamp for receiving the post and a small clamp for receiving the fishing pole. The clamps are positioned along a center line of the base such that the post and pole flank the vertical projection and remain in parallel relationship while being stored. The fishing pole is equipped with an aperture which extends through the center thereof. The pivot pin extends through the hole. During use, the pivot pin rests on the small notch such that the pole may be pivoted within the large notch. The fishing pole also includes a hole through one end thereof for the passage of fishing line therethrough. The hole preferably resides about a vertical axis which is perpendicular with respect to both the pivot pin and axis of the pole. Also provided is a rotatable disk-shaped reel with a line secured to the post about a vertical axis. The reel has an associated bolt which extends upwardly from the pole and through the reel with an associated wing nut to vary the force needed to pull line from the reel and further allow the removal thereof. For manually dispensing and retracting the line, the reel preferably has a handle eccentrically mounted on the reel. A vertically extending eyelet is coupled to the pole between the reel and the hole for guiding the movement of string therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new ice fishing system apparatus and method which has many of the advantages of the ice fishing devices mentioned heretofore and many novel features that result in a new ice fishing system which is not anticipated, rendered obvious, suggested, or even implied by any of the prior art ice fishing devices, either alone or in any combination thereof.

It is another object of the present invention to provide a new ice fishing system which may be easily and efficiently manufactured and marketed.

It is a further object of the present invention to provide a new ice fishing system which is of a durable and reliable construction.

An even further object of the present invention is to provide a new ice fishing system which is susceptible of a low cost of manufacture with regard to both materials and labor, and which accordingly is then susceptible of low prices of sale to the consuming public, thereby making such ice fishing system economically available to the buying public.

Still yet another object of the present invention is to provide a new ice fishing system which provides in the apparatuses and methods of the prior art some of the advantages thereof, while simultaneously overcoming some of the disadvantages normally associated therewith.

Still another object of the present invention is to provide a new ice fishing system for providing a portable ice fishing unit which affords minimal resistance upon a fish strike.

Even still another object of the present invention is to provide a new ice fishing system that includes a post having a lower end and an upper end. Also included is a fishing pole pivotally coupled to the upper end of the post with fishing line depending from an end thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the ice fishing system constructed in accordance with the principles of the present invention.

FIG. 2 is a side elevational view of the system shown in FIG. 1.

FIG. 3 is a top elevational view of the system shown in the prior Figures taken at line 3—3 of FIG. 2.

FIG. 4 is a cross-sectional view taken along line 4—4 of FIG. 3.

The same reference numerals refer to the same parts through the various Figures.

DESCRIPTION OF THE PREFERRED EMBODIMENT

Figure 5:
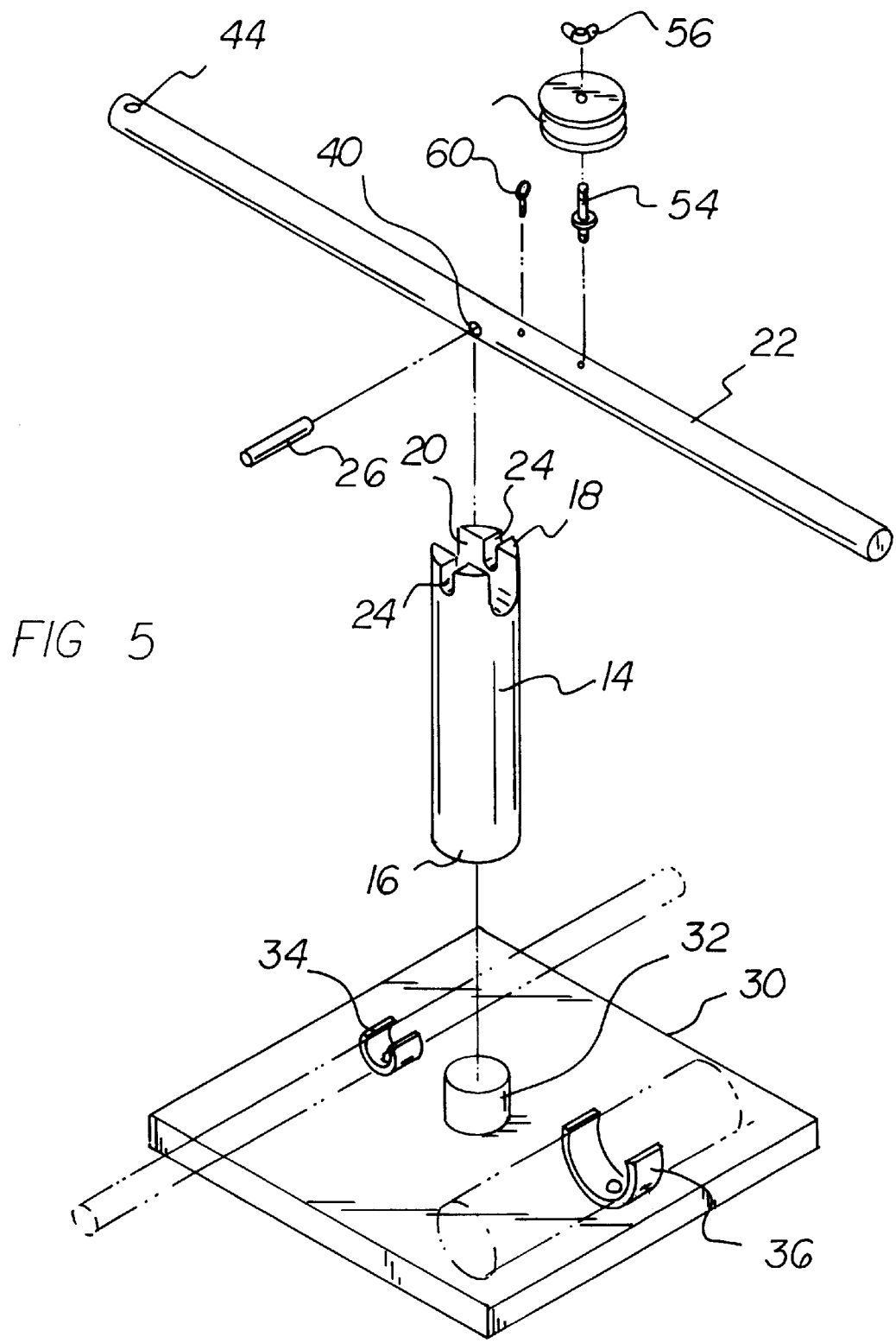
FIG. 5 is an exploded perspective view of the system shown in the prior Figures.

With reference now to the drawings, and in particular to FIG. 1 thereof, the preferred embodiment of the new and improved ice fishing system embodying the principles and concepts of the present invention and generally designated by the reference numeral 10 will be described.

The present invention, the ice fishing system 10 is comprised of a plurality of components. Such components are individually configured and correlated with respect to each other so as to attain the desired objective.

The ice fishing system of the present invention comprises a vertically disposed post 14 which has a large U-shaped notch 20 at its upper end for receiving a fishing pole 22 and a small U-shaped notch 24 at the upper end for receiving a pivot pin 26, as soon will become apparent. The notches are at right angles with respect to each other. A lower end of the post is equipped with a disk-shaped recess formed therein.

A planar rectangular base 30 is provided with an upstanding cylindrical projection 32 for frictionally receiving the lower end of the post. The base also has two upwardly extending resilient U-shaped clamps 34, 36. Such clamps include a large clamp for receiving the post and a small clamp for receiving the fishing pole 22. The clamps are positioned along a center line of the base such that the post and pole flank the vertical projection and remain in parallel relationship while being stored.

The fishing pole is equipped with an aperture 40 which extends through the center thereof. The pivot pin extends through the hole. During use, the pivot pin rests on the small notch such that the pole may be pivoted within the large notch. The fishing pole also includes a hole 44 through one end thereof for the passage of fishing line 46 therethrough. The hole preferably resides about a vertical axis which is perpendicular with respect to both the pivot pin and axis of the pole.

Also provided is a rotatable disk-shaped reel 50 with a line 46 secured to the post about a vertical axis. The reel has an associated bolt 54 which extends upwardly from the pole and through the reel with an associated wing nut 56 to vary the force needed to pull line from the reel and further allow the removal thereof. For manually dispensing and retracting the line, the reel preferably has a handle eccentrically mounted on the reel. A vertically extending eyelet 60 is coupled to the pole between the reel and the hole for guiding the movement of string therethrough.

The present invention consists of an ice fishing assembly with a pole, vertical stand, and base platform. The components disassemble for storage. The pole is 20 inches long and supports a line spool on its top. The spool secures to the pole via a wing nut is tightened to adjust drag. Line runs through a guide eye along the pole length and down through a hole in the pole end. The stand is 8 inches high and provides balance notches at its top that allow balance pegs on the side of the pole center. The base is 16 inches wide and includes clips to hold the pole and stand when the unit is disassembled.

When fishing with the system of the present invention, a fisherman is alerted of a fish taking his line by the pole end tipping down toward the ice fishing hole, which results from the line being pulled. By way of the tipping effect and uniquely constructed reel, line is let out with little or no resistance, reducing the risk that the fish would detect the line and spit the bait out before the fish can be hooked.

The appealing features of the present invention are its ability to help ice fisherman catch more fish, as well as its ease in use and compact storage size. Many ice fishermen use a device called a tip-up so that they can set their bait at the desired depth and then leave the line unattended until a fish strikes. When a fish strikes, the flag on the tip-up will spring into the air and signal the fisherman that a fish is biting. However, after biting on a conventional tip-up, a fish can feel the line become taut as it swims away. This alerts the fish to danger, and it may spit out the bait before the angler has time to set the hook and reel in the fish. With the present invention, the line would be let out until the fisherman can get to his pole and set the hook.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An ice fishing system comprising:

a base;

a post having a lower end and an upper end, the lower end of the post being removably mounted on the base;

a fishing pole pivotally coupled to the upper end of the post with fishing line depending from an end thereof;

at least one resilient U-shaped clamp mounted on the base and adapted for removably receiving the post when the post is removed from its mounted condition on the base to thereby permit storage of the post and base in a collapsed condition.

2. An ice fishing system as set forth in claim 1 wherein the pole has a balanced, unbiased horizontal orientation and further tips upon a fish strike.

3. An ice fishing system as set forth in claim 1 wherein the pole is removably coupled to the post, wherein the post and pole are removably coupled to the base in coplanar relationship therewith for storage purposes.

4. An ice fishing system as set forth in claim 1 wherein a second resilient U-shaped clamp is mounted on the base for removably receiving the fishing pole when the fishing pole is removed from the post.

5. An ice fishing system as set forth in claim 1 wherein a reel is connected to the line for selectively reeling the same.

6. An ice fishing system as set forth in claim 5 wherein the reel is mounted on the fishing pole.

7. An ice fishing system as set forth in claim 5 wherein a drag of the reel is adjustable.

8. An ice fishing system as set forth in claim 7 wherein the drag is adjusted by way of a wing nut that is tightened on a bolt about which the reel is coupled.

9. An ice fishing system for balancing a fishing pole on a pivot pin to minimize its resistance to detected motion comprising:

a post having a lower end and an upper end, the post being formed with a first notch at its upper end for receiving a fishing pole and a second notch at the upper end for receiving a pivot pin, the notches being at right angles with respect to each other;

a base having the lower end of the post mounted thereon, the base also having two upwardly extending resilient U-shaped clamps for receiving the post and a fishing pole;

a fishing pole with a pivot pin mounted thereon, the pivot pin extending substantially perpendicular to a longitudinal axis of the fishing pole, the pivot pin being restable on the second notch, the fishing pole also including a fishing line guidance loop at one end of the fishing pole for the passage of fishing line therethrough;

a rotatable reel mounted on the pole, the reel having fishing line wrapped thereabout, the reel having means mounted thereon for varying the force required to pull fishing line from the reel.

10. An ice fishing system for balancing a fishing pole on a pivot pin to minimize its resistance to detected motion comprising, in combination:

a vertically disposed post having a lower end and an upper end, the post being formed with a large notch at its upper end for receiving a fishing pole and a small notch at the upper end for receiving a pivot pin, the notches being at right angles with respect to each other;

a base with an upstanding vertical projection receiving the lower end of the post, the base also having two upwardly extending resilient U-shaped clamps for receiving the post and a fishing pole;

a fishing pole with an aperture extending through the center thereof with a pivot pin therethrough and resting on the small notch, the fishing pole also including a hole through one end thereof for the passage of fishing line therethrough;

a rotatable reel secured to the post for rotation about a vertical axis, the reel having fishing line wrapped thereabout, the reel having an associated bolt extending upwardly from the pole and through the reel with an associated nut to vary the force needed to pull line from the reel; and an eyelet coupled to the pole between the reel and the hole for guiding the movement of fishing line therethrough.

* * * * *